United States Patent
Taherzadeh Boroujeni et al.

(10) Patent No.: US 11,985,669 B2
(45) Date of Patent: May 14, 2024

(54) DEMODULATION USING DEMODULATION REFERENCE SIGNALS FROM MULTIPLE COMPONENT CARRIERS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/644,290

(22) Filed: Dec. 14, 2021

(65) Prior Publication Data

US 2022/0337459 A1    Oct. 20, 2022

Related U.S. Application Data

(60) Provisional application No. 63/176,588, filed on Apr. 19, 2021.

(51) Int. Cl.
*H04W 72/21*     (2023.01)
*H04L 5/00*      (2006.01)
*H04L 27/26*     (2006.01)

(52) U.S. Cl.
CPC ........... *H04W 72/21* (2023.01); *H04L 5/001* (2013.01); *H04L 5/0051* (2013.01); *H04L 27/26025* (2021.01); *H04L 27/261* (2013.01)

(58) Field of Classification Search
CPC .................. H04W 72/21; H04L 5/001
See application file for complete search history.

(56) References Cited

U.S. PATENT DOCUMENTS

| | | | |
|---|---|---|---|
| 2019/0159181 A1* | 5/2019 | Manolakos | H04W 72/23 |
| 2021/0014095 A1 | 1/2021 | Ly et al. | |
| 2023/0247632 A1* | 8/2023 | Gou | H04L 1/1896 370/329 |

(Continued)

FOREIGN PATENT DOCUMENTS

| | | | |
|---|---|---|---|
| EP | 2472809 A1 | 7/2012 | |
| WO | WO-2018158925 A1 | 9/2018 | |

OTHER PUBLICATIONS

International Search Report and Written Opinion—PCT/US2022/071143—ISA/EPO—dated Jun. 7, 2022 (2104393WO).

(Continued)

*Primary Examiner* — Kevin C. Harper
(74) *Attorney, Agent, or Firm* — Norton Rose Fulbright US LLP/Qualcomm Incorporated

(57) ABSTRACT

A method of wireless communication performed by a base station includes receiving one or more particular signals. The method further includes receiving one or more transmissions associated with a first CC and a second CC. The one or more transmissions include first data and a first demodulation reference signal (DMRS) that are associated with the first CC, and the one or more transmissions further include second data and a second DMRS that are associated with the second CC. A determination whether to demodulate the second data using the first DMRS is based on the one or more particular signals.

30 Claims, 5 Drawing Sheets

(56) References Cited

U.S. PATENT DOCUMENTS

2023/0291523 A1* 9/2023 Hasegawa ............. H04L 5/0044
370/329

OTHER PUBLICATIONS

Zte, et al., "Remaining Details on PT-RS", 3GPP TSG RAN WG1 Meeting 90bis, 3GPP Draft, R1-1717434, vol. RAN WG1, No. Prague, CZ, Oct. 9, 2017-Oct. 13, 2017, Oct. 8, 2017 (Oct. 8, 2017), XP051340623, 7 Pages, Retrieved from the Internet: URL: http://www.3gpp.org/ftp/Meetings_3GPP_SYNC/RAN1/Docs/ [retrieved on Oct. 8, 2017].

* cited by examiner

DEMODULATION USING DEMODULATION REFERENCE SIGNALS FROM MULTIPLE COMPONENT CARRIERS

CROSS-REFERENCE TO RELATED APPLICATIONS

This application claims the benefit of and priority to U.S. Prov. Pat. App. No. 63/176,588, entitled "DEMODULATION USING DEMODULATION REFERENCE SIGNALS FROM MULTIPLE COMPONENT CARRIERS" and filed on Apr. 19, 2021, which is expressly incorporated by reference herein in its entirety.

TECHNICAL FIELD

Aspects of the present disclosure relate generally to wireless communication systems, and more particularly, to wireless communication systems that use demodulation reference signals (DMRSs) and component carriers (CCs).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication performed by a base station includes receiving one or more particular signals. The method further includes receiving one or more transmissions associated with a first CC and a second CC. The one or more transmissions include first data and a first demodulation reference signal (DMRS) that are associated with the first CC, and the one or more transmissions further include second data and a second DMRS that are associated with the second CC. A determination whether to demodulate the second data using the first DMRS is based on the one or more particular signals.

In some other aspects, a base station for wireless communication includes a transmitter and a receiver. The receiver is configured to receive one or more particular signals and one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In some other aspects, a non-transitory computer-readable medium stores instructions executable by a base station to initiate, perform, or control operations. The operations include receiving one or more particular signals and receiving one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In some other aspects, a base station for wireless communication includes means for transmitting. The base station further includes means for receiving one or more particular signals and for receiving one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In some other aspects, a method of wireless communication performed by a user equipment (UE) includes transmitting one or more particular signals. The method further includes transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether demodulate the second data using the first DMRS based on the one or more particular signals.

In some other aspects, a UE for wireless communication includes a receiver and a transmitter configured to transmit one or more particular signals. The transmitter is further configured to transmit one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether demodulate the second data using the first DMRS based on the one or more particular signals.

In some other aspects, a non-transitory computer-readable medium stores instructions executable by a UE to initiate, perform, or control operations. The operations include transmitting one or more particular signals and further include transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether demodulate the second data using the first DMRS based on the one or more particular signals.

In some other aspects, a UE for wireless communication includes means for receiving and means for transmitting one or more particular signals and for transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether demodulate the second data using the first DMRS based on the one or more particular signals.

In some other aspects, an apparatus for wireless communication by a base station includes a transmitter, a receiver, at least one processor, and a memory. The memory stores instructions executable by the at least one processor to cause the receiver to receive one or more particular signals and to receive one or more transmissions associated with a first CC and a second CC. The one or more transmissions include first data and a first DMRS that are associated with the first CC. The one or more transmissions further include second data and a second DMRS that are associated with the second CC. A determination whether to demodulate the second data using the first DMRS is based on the one or more particular signals.

In some other aspects, a method of wireless communication performed by a base station includes receiving one or more particular signals and receiving one or more transmissions associated with a first CC and a second CC. The one or more transmissions include first data and a first DMRS that are associated with the first CC. The one or more transmissions further include second data and a second DMRS that are associated with the second CC. A determination of whether to demodulate the second data using the first DMRS is based on the one or more particular signals.

In some other aspects, an apparatus for wireless communication by a UE includes a transmitter, a receiver, at least one processor, and a memory. The memory stores instructions executable by the at least one processor to cause the transmitter to transmit one or more particular signals and to transmit one or more transmissions associated with a first CC and a second CC. The one or more transmissions include first data and a first DMRS that are associated with the first CC, and the one or more transmissions further include second data and a second DMRS that are associated with the second CC. The transmission of the one or more particular signals enables a determination of whether to demodulate the second data using the first DMRS based on the one or more particular signals.

In some other aspects, a method of wireless communication performed by a UE, the method includes transmitting one or more particular signals and transmitting one or more transmissions associated with a first CC and a second CC. The one or more transmissions include first data and a first DMRS that are associated with the first CC, and the one or more transmissions further include second data and a second DMRS that are associated with the second CC. Transmitting the one or more particular signals enables a determination of whether to demodulate the second data using the first DMRS based on the one or more particular signals.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
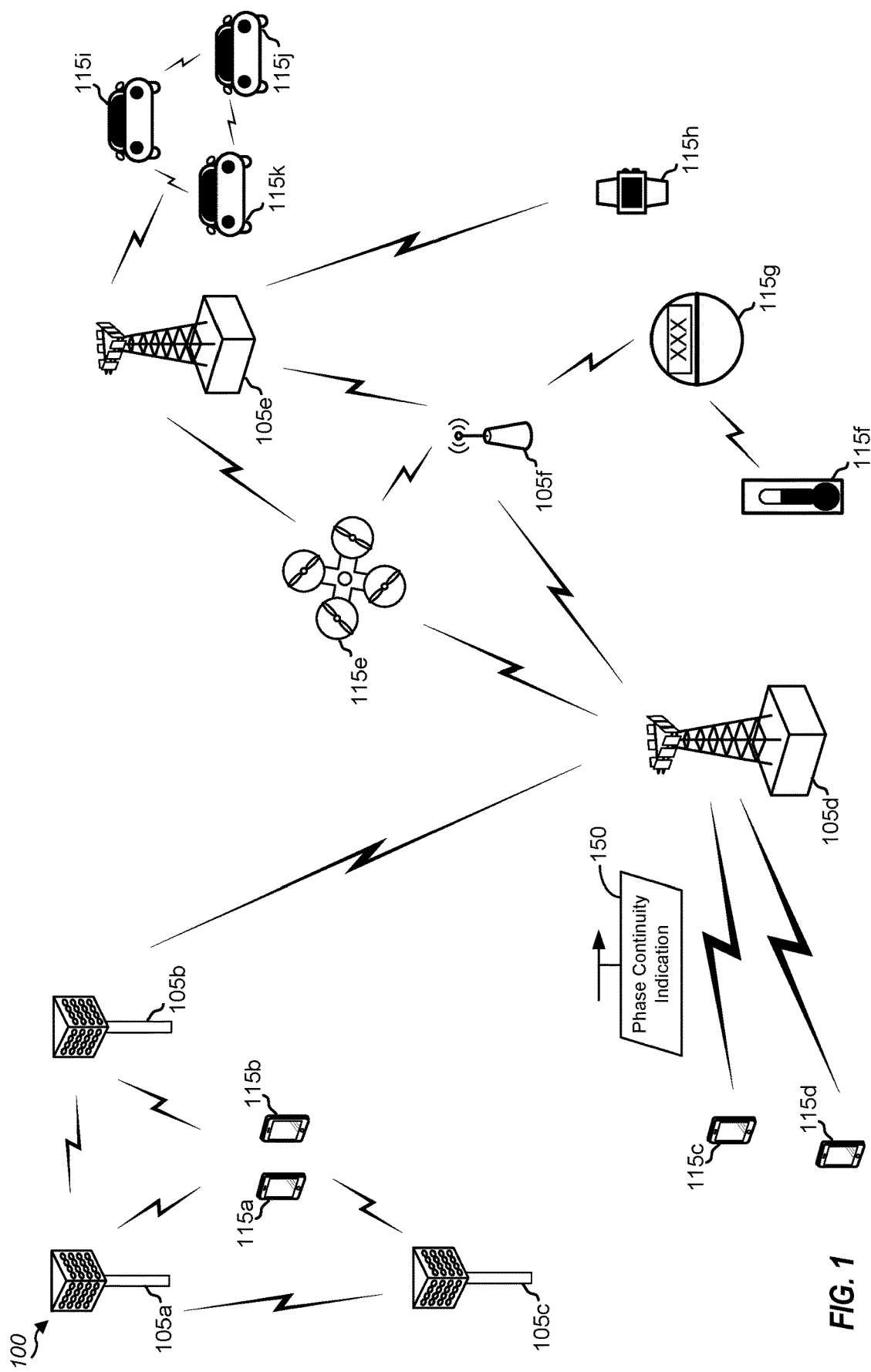
FIG. 1 is a block diagram illustrating an example of a wireless communication system according to one or more aspects.

Some wireless communication systems use certain reference signals to measure or estimate noise and interference. For example, a transmitting device may transmit a demodulation reference signal (DMRS) with data to a receiving device. In some wireless communication protocols, the transmitted DMRS includes a pattern of values that is known to the receiving device. The receiving device may compare the received DMRS to the known pattern to determine an effect of the noise or interference on the data. For example, the receiving device may determine a channel estimate based on the received DMRS and may adjust values of the received data using the channel estimate (e.g., to compensate for effects of the noise or interference on the data).

As a number of wireless communication channels and wireless communications increases, more reference signals (such as DMRSs) may be transmitted within wireless communication systems. The increased number of reference signals may increase noise and interference and may also increase power consumption for devices.

In some aspects of the disclosure, one or more devices of a wireless communication system may selectively determine whether to perform a joint channel estimation operation associated with multiple component carriers (CCs). The joint channel estimation operation may be referred to herein as "sharing" or "bundling" of DMRSs associated with different CCs.

To illustrate, a base station may receive, from a user equipment (UE), first data and a first DMRS via a first CC and may receive second data and a second DMRS via a second CC. The base station may determine whether to demodulate the second data based on the first DMRS and the second DMRS (e.g., using the joint channel estimation operation) or to demodulate the second data independently of the first DMRS (e.g., using separate channel estimation operations associated with the first CC and the second CC).

The base station may perform the determination whether to perform the joint channel estimation operation based on one or more signals received from the UE. In some examples, the one or more signals may include a UE capability message indicating a phase continuity of the UE, such as an ability of the UE to maintain phase (e.g., within a particular range) when switching between the first CC and the second CC. Alternatively or in addition, the base station may use a PTRS associated with one CC to determine a phase offset estimate associated with another CC. The base station may perform the joint channel estimation operation based on determining (e.g., using the UE capability message or the PTRS) that an amount of phase continuity supported by the UE fails to exceed a phase continuity threshold.

Performing a joint channel estimation operation for multiple CCs based on an amount of phase continuity supported by a UE may enhance operation of a wireless communication system. For example, the joint channel estimation operation may improve accuracy of demodulation of signals transmitted by the UE via the multiple CCs, which may in some cases enable a reduction in the number or density of reference signals transmitted within the wireless communication system. Alternatively or in addition, the improved accuracy of demodulation of signals may reduce a number of dropped packets or retransmissions within the wireless communication system.

Further, by selectively determining whether to perform a joint channel estimation based on an amount (or estimated amount) of phase continuity of a UE, reliability of the joint channel estimation may be improved. For example, because a relatively large phase difference between DMRSs may reduce reliability of a joint channel estimate that is based on the DMRSs, the base station may perform separate channel estimation operations in such cases, which may avoid use of a less reliable joint channel estimate. In some other circumstances, the base station may perform a joint channel estimation operation based on detecting that the UE supports phase continuity between the DMRSs, which may increase reliability of a joint channel estimate. As a result, accuracy of demodulation may be increased while reducing or avoiding instances of inaccurate joint channel estimates that may result from phase differences in DMRSs in some cases.

Some aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation NB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a satellite positioning system (SPS) device, a position or location determination device, a logistics controller, a robot or robotic device, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical or healthcare device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some examples, one or more UEs illustrated in FIG. 1 may transmit a phase continuity indication 150. For example, the UE 115c may transmit (e.g., to the base station 105d) the phase continuity indication 150.

Figure 2:
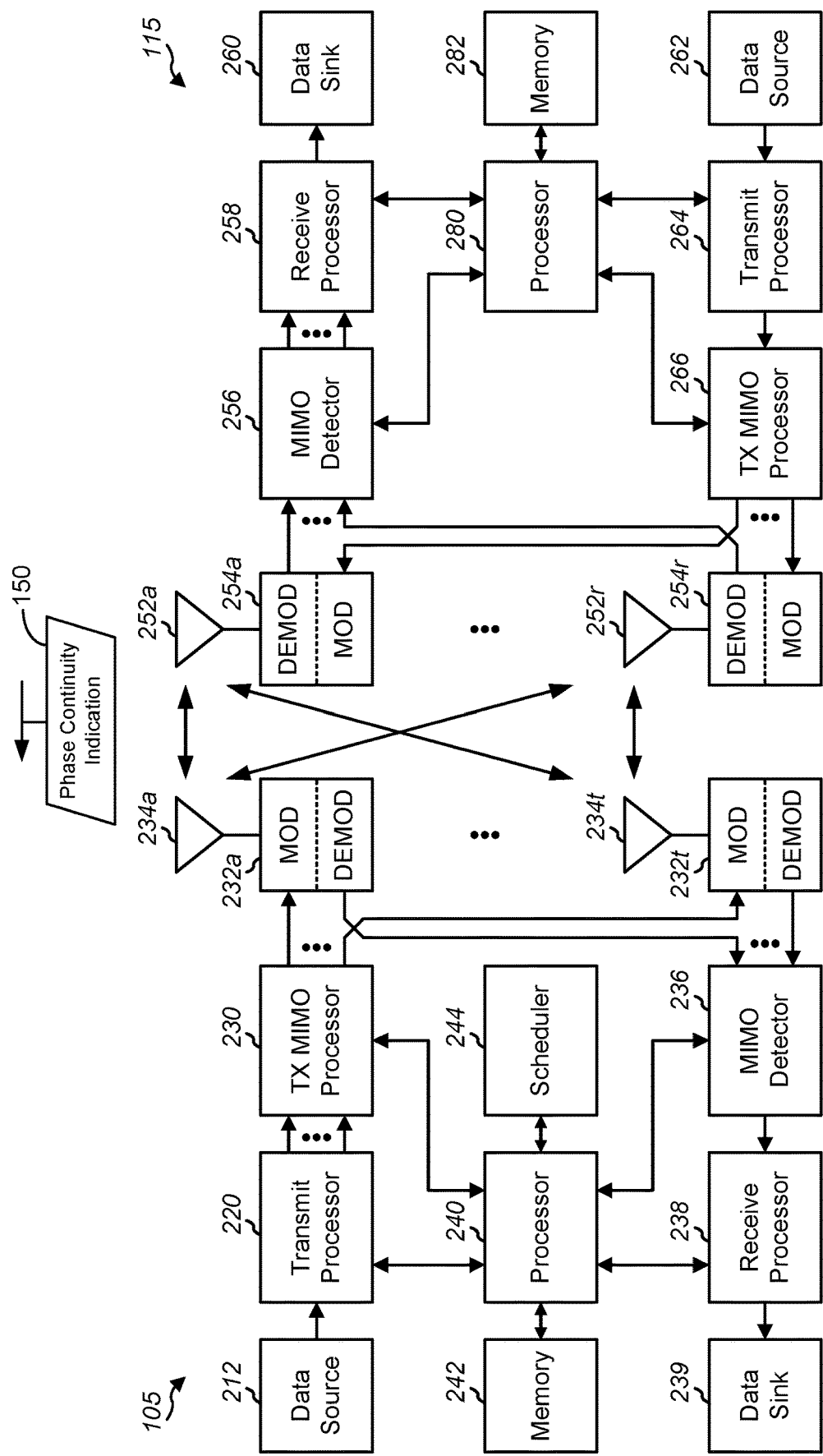
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

To further illustrate, in some examples, the processor 280 may execute instructions stored at the memory 282 to initiate transmission of the phase continuity indication 150 to the base station 105. The processor 240 may execute instructions stored at the memory 242 to control reception of the phase continuity indication 150 from the UE 115.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
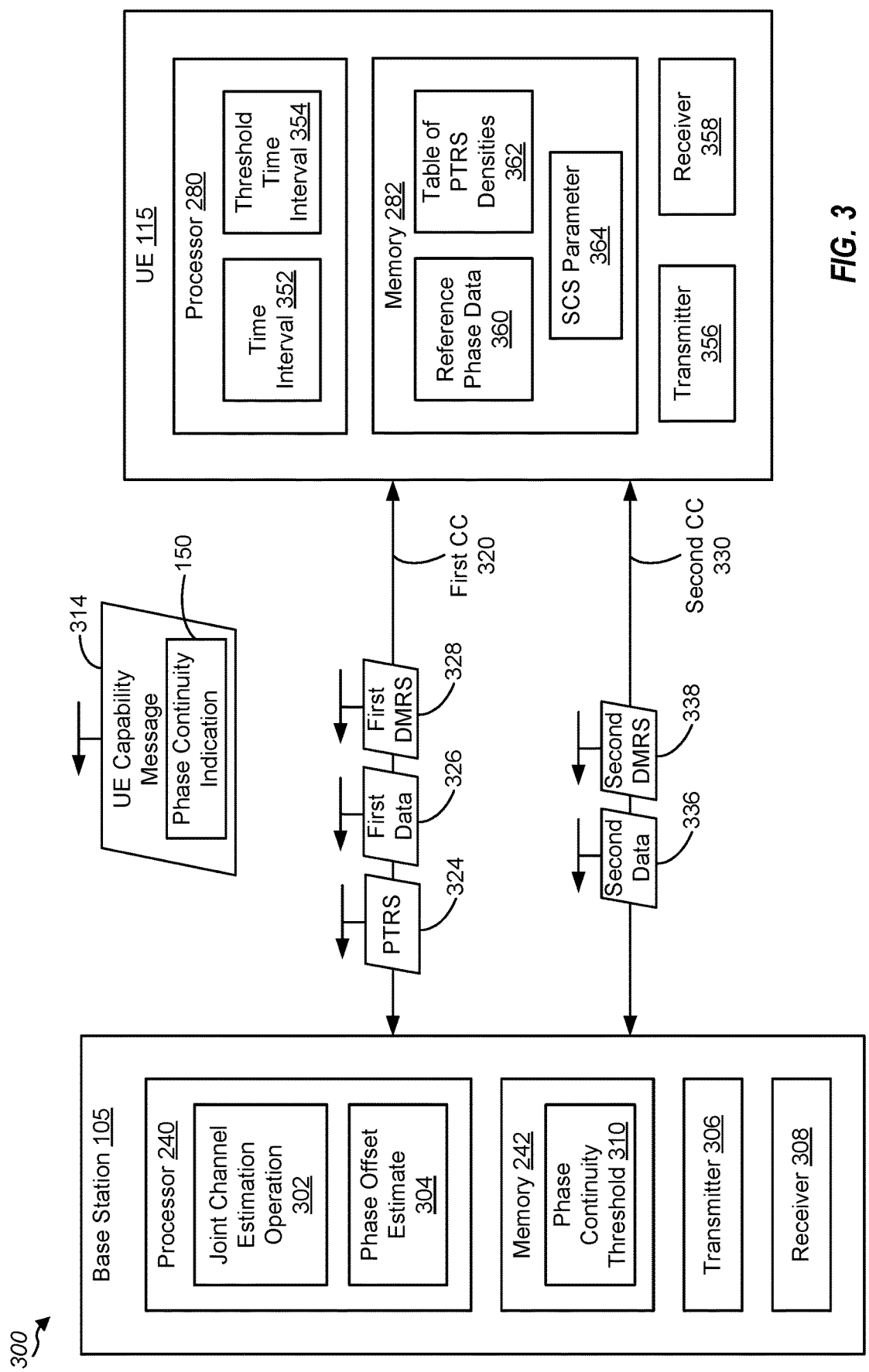
FIG. 3 is a block diagram illustrating an example of a wireless communication system according to one or more aspects.

FIG. 3 is a block diagram illustrating an example of a wireless communication system 300 according to some aspects of the disclosure. The wireless communication system 300 may include one or more base stations, such as the base station 105. The wireless communication system 300 may further include one or more UEs, such as the UE 115.

The example of FIG. 3 illustrates that the base station 105 may include one or more processors (such as the processor 240) and may include the memory 242. The base station 105 may further include a transmitter 306 and a receiver 308. The processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230.

The transmitter 306 may transmit reference signals, synchronization signals, control information, and data to one or more other devices, and the receiver 308 may receive reference signals, control information, and data from one or more other devices. For example, the transmitter 306 may transmit signaling, control information, and data to the UE 115, and the receiver 308 may receive signaling, control information, and data from the UE 115. In some implementations, the transmitter 306 and the receiver 308 may be integrated in one or more transceivers of the base station 105.

FIG. 3 also illustrates that the UE 115 may include one or more processors (such as the processor 280), a memory (such as the memory 282), a transmitter 356, and a receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communication system 300 operates in accordance with a 5G NR network. For example, the wireless communication system 300 may include multiple 5G-capable UEs 115 and multiple 5G-capable base stations 105, such as UEs and base stations configured to operate in accordance with a 5G NR network protocol such as that defined by the 3GPP.

During operation, the base station 105 may configure the UE 115 with resources for uplink transmissions performed by the UE 115. In some examples, the base station 105 may configure the UE 115 with multiple component carriers (CCs). For example, the base station 105 may configure the UE 115 with a first CC 320 and a second CC 330. In some other examples, the base station 105 may configure the UE 115 with a different number of CCs. In some cases, the UE 115 may aggregate the CCs 320, 330 in connection with a carrier aggregation (CA) technique and may use the CCs 320, 330 in connection with a transmission (e.g., a multi-CC transmission). In some other cases, the UE 115 may use the CCs 320, 330 for separate transmissions.

To further illustrate, in some examples, the UE 115 may transmit first data 326 to the base station 105 via the first CC 320 and may transmit second data 336 to the base station 105 via the second CC 330. The UE 115 may also transmit a first demodulation reference signal (DMRS) 328 to the base station 105 via the first CC 320 and may transmit a second DMRS 338 to the base station 105 via the second CC 330. In some examples, the first data 326 may correspond to a first repetition of a transmission, and the second data 336 may correspond to a second repetition of the transmission. For example, the first data 326 and the second data 336 may correspond to repetitions of a physical uplink shared channel (PUSCH) transmission or of a physical uplink control channel (PUCCH) transmission, as illustrative examples.

Transmitting the first DMRS 328 via the first CC 320 and the second DMRS 338 via the second CC 330 may enable the base station 105 to demodulate the first data 326 and the second data 336, respectively. For example, in some cases, the base station 105 may determine, based on the first DMRS 328, a first channel estimate associated with the first CC 320 and may determine, based on the second DMRS 338, a second channel estimate associated with the second CC 330. In some examples, the base station 105 may demodulate the first data 326 using the first channel estimate and may demodulate the second data 336 using the second channel estimate.

In some aspects of the disclosure, the base station 105 may determine whether to perform a joint channel estimation operation 302. Performing the joint channel estimation operation 302 may include demodulating the first data 326 based on the first DMRS 328 and further based on the second DMRS 338. Alternatively or in addition, performing the joint channel estimation operation 302 may include demodulating the second data 336 based on the first DMRS 328 and further based on the second DMRS 338. In some examples, performing the joint channel estimation operation 302 based on the DMRSs 328, 338 may be referred to as "bundling" the DMRSs 328, 338 or "sharing" the DMRSs 328, 338.

In some aspects, the base station 105 may determine whether to perform the joint channel estimation operation 302 based on a determination whether the UE 115 supports phase continuity. As referred to herein, phase continuity may refer to an amount of phase change that fails to exceed a particular threshold amount of phase change. As an example, if the particular threshold amount of phase change is two degrees, and if a change by the UE 115 between use of the first CC 320 to use of the second CC 330 is associated with a phase change of one degree (e.g., where a phase of the first data 326 differs from a phase of the second data 336 by one degree), then the UE 115 may be referred to as supported phase continuity between the first CC 320 and the second CC 330.

An example of phase continuity may include inter-CC phase continuity. As referred to herein, maintaining inter-CC phase continuity may include maintaining phase continuity between first resources of the first CC 320 and second resources of the second CC 330 after switching from use of the first resources to use of the second resources. Another example of phase continuity may include multi-CC phase continuity. As referred to herein, maintaining multi-CC phase continuity may include maintaining phase continuity between first resources of the first CC 320 and second resources of the first CC 320 after switching from use of the first resources to use of the second resources. Maintaining multi-CC phase continuity may also include maintaining phase continuity between third resources of the second CC 330 and fourth resources of the second CC 330 after switching from use of the first resources to use of the second resources. Thus, maintaining inter-CC phase continuity may involve a switch between resources of the first CC 320 and resources of the second CC 330, and maintaining multi-CC continuity may involve a switch between resources of the first CC 320.

In some implementations, the base station 105 may determine whether the UE 115 supports phase continuity based on the phase continuity indication 150. For example, the UE 115 may transmit a UE capability message 314 including the phase continuity indication 150, and the base station 105 may determine, after receiving the UE capability message 314, whether the UE 115 supports phase continuity based on the phase continuity indication 150.

In some implementations, the UE 115 transmits the UE capability message 314 based on one or both of the UE or the base station including a common radio frequency (RF) device (e.g., an RF front-end device) for the first data 326 and the second data 336. To illustrate, the common RF device may include or correspond to a common transmitter 356 (or component of the transmitter 356) that is used to transmit the first data 326 and the second data 336. Alternatively or in addition, the common RF device may include or correspond to a common receiver 308 (or component of the receiver 308) that is used to receive the first data 326 and the second data 336. In some cases, use of a common RF device may increase phase continuity between the first data 326 and the second data 336.

Alternatively or in addition, the UE 115 may transmit the UE capability message 314 based on a determination that a particular time interval 352 to switch from use of the first resources of the first CC 320 to the second resources of the second CC 330 fails to exceed a threshold time interval 354. In this case, after transmitting the first data 326, the UE 115 may have sufficient time to adjust the transmitter 356 so that phase of the second data 336 corresponds to phase of the first data 326. For example, the UE 115 may retrieve reference phase data 360 from the memory 282 and may adjust the transmitter 356 so that phase of the second data 336 corresponds to phase of the first data 326.

In some examples, the phase continuity indication 150 may indicate a capability of the UE 115 to maintain one or more types of phase continuity (e.g., one or both of inter-CC phase continuity or multi-CC phase continuity) during certain operations, such as switching from use of the first CC 320 to use of the second CC 330 (or vice versa). For example, in some implementations, the phase continuity indication 150 may include or correspond to a flag (or a bit) having a value (such as a logic one value or a logic zero value) indicating whether the UE 115 supports one or more types of phase continuity during certain operations. Alternatively or in addition, the phase continuity indication 150 may indicate a capability to maintain a particular amount of phase continuity. For example, the particular amount of phase continuity may correspond to a number of degrees.

In some implementations, the base station 105 may compare a particular amount of phase continuity specified by the phase continuity indication 150 to a phase continuity threshold 310. In some examples, the base station 105 performs the joint channel estimation operation 302 based on determining that the particular amount of phase continuity fails to exceed the phase continuity threshold 310. In such examples, the base station 105 may demodulate both the first data 326 and the second data 336 based on a result of the joint channel estimation operation 302 (e.g., based on a joint channel estimate determined via the joint channel estimation operation 302). In some other cases, if the particular amount of phase continuity exceeds the phase continuity threshold 310, the base station 105 may perform separate channel estimation operations for the first data 326 and the second data 336 using the first DMRS 328 and the second DMRS 338, respectively, and may demodulate the first data 326 separately from the second data 336.

Alternatively or in addition to the phase continuity indication 150, in some examples, the base station 105 may determine whether to perform the joint channel estimation operation 302 based on a phase tracking reference signal (PTRS) received from the UE 115. For example, the UE 115 may transmit a PTRS 324 associated with the first CC 320, and the base station 105 may determine a phase offset estimate 304 associated with the second CC 330 based on the PTRS 324 (e.g., by comparing a phase of the PTRS 324 to a phase of the second data 336 or the second DMRS 338). For example, the phase offset estimate 304 may indicate a number of degrees by which a phase of the first data 326 differs from a phase of the second data 336.

In some implementations, the base station 105 may configure the UE 115 with a table of PTRS densities 362. The table of PTRS densities 362 may indicate one or more of time density (such as periodicity) or frequency density of the PTRS 324 (e.g., as a function of the particular modulation and coding scheme (MCS) used by the UE 115). In some implementations, the table of PTRS densities 362 may correspond to an updated table that is reserved for use in connection with the joint channel estimation operation 302. For example, the table of PTRS densities 362 may increase one or both of time density or frequency density of the PTRS 324 to improve accuracy of the phase estimate offset 304 as compared to another table of PTRS densities associated with the PTRS 324 (such as a "default" table of PTRS densities that may be used by the UE 115 during a single-carrier mode of operation).

In some examples, the base station 105 compares the phase offset estimate 304 to the phase continuity threshold 310 (or another threshold). The base station 105 may perform the joint channel estimation operation 302 based on determining that the phase offset estimate 304 fails to exceed the phase continuity threshold 310. In such examples, the base station 105 may demodulate both the first data 326 and the second data 336 based on a result of the joint channel estimation operation 302 (e.g., based on a joint channel estimate determined via the joint channel estimation operation 302). In some other cases, if the phase offset estimate 304 exceeds the phase continuity threshold 310, the base station 105 may perform separate channel estimation operations for the first data 326 and the second data 336 using the first DMRS 328 and the second DMRS 338, respectively, and may demodulate the first data 326 separately from the second data 336.

In some examples, the base station 105 uses both the phase continuity indication 150 and the PTRS 324 to determine whether to perform the joint channel estimation operation 302. For example, the base station 105 may determine a parameter based on a particular amount of phase continuity specified by the phase continuity indication 150 and further based on the phase offset estimate 304. The base station 105 may compare the parameter to a threshold and may perform the joint channel estimation operation 302 based on a determination that the parameter fails to exceed the threshold.

In certain cases, the particular amount of phase continuity specified by the phase continuity indication 150 may exceed the phase continuity threshold 310, and the phase offset estimate 304 may fail to exceed the phase continuity threshold 310. In some such examples, the base station 105 may disregard the particular amount of phase continuity specified by the phase continuity indication 150 and perform the joint channel estimation operation 302 irrespective of the particular amount of phase continuity failing to exceed the phase continuity threshold 310.

Alternatively or in addition to the phase continuity indication 150 or the PTRS 324, in some examples, the base station 105 may perform the joint channel estimation operation 302 based on one or both of the UE 115 or the base station 105 including a common RF device for the first data 326 and the second data 336. For example, the UE 115 may transmit an indication that the UE 115 includes a common RF device (such as a common transmitter 356 or portion of the transmitter 356) to transmit the first data 326 and the second data 336. The base station 105 may perform the joint channel estimation operation 302 based on the indication that the UE 115 includes the common RF device.

In some examples, the base station 105 may perform the joint channel estimation operation 302 based further on the first CC 320 and the second CC 330 being associated with a common subcarrier spacing (SCS) parameter 364 (such as a common numerology). In some such examples, use of the common SCS for the first CC 320 and the second CC 330 may improve phase continuity between the first CC 320 and the second CC 330. In some other examples, if the first CC 320 and the second CC 330 are associated with different SCS parameters, then the base station 105 may separately demodulate the first data 326 and the second data 336.

Although certain examples have been described with reference particular devices, it should be appreciated that such examples may also be applicable to other devices. For example, in some implementations, the UE 115 may determine or estimate an amount of phase continuity of the base station 105 and may perform a joint channel estimation operation based on the amount of phase continuity of the base station 105 to demodulate downlink signals received from the base station 105. Alternatively or in addition, the UE 115 may determine or estimate an amount of phase continuity of another UE and may perform a joint channel estimation operation based on the amount of phase continuity of the other UE to demodulate sidelink signals received from the other UE.

One or more aspects described herein may improve performance of a wireless communication system. For example, performing the joint channel estimation operation 302 may improve accuracy of demodulation of signals transmitted by the UE 115 via the CCs 320, 330, which may in some cases enable a reduction in the number or density of reference signals transmitted within the wireless communication system 300. Alternatively or in addition, the improved accuracy of demodulation of signals may reduce a number of dropped packets or retransmissions within the wireless communication system 300.

Further, by selectively determining whether to perform the joint channel estimation operation 302 based on an amount (or estimated amount) of phase continuity of the UE 115, reliability of joint channel estimation operations 302 may be improved. For example, because a relatively large phase difference between the DMRSs 328, 338 may reduce reliability of the joint channel estimation operation 302, the base station 105 may perform separate channel estimation operations in such cases, which may avoid use of a less reliable joint channel estimate. In some other circumstances, the base station 105 may perform a joint channel estimation operation 302 based on detecting that the UE 115 supports phase continuity between the DMRSs 328, 338, which may increase reliability of a joint channel estimate. As a result, accuracy of demodulation may be increased while reducing or avoiding instances of inaccurate joint channel estimates that may result from phase differences in DMRSs in some cases.

Figures 4, 5:
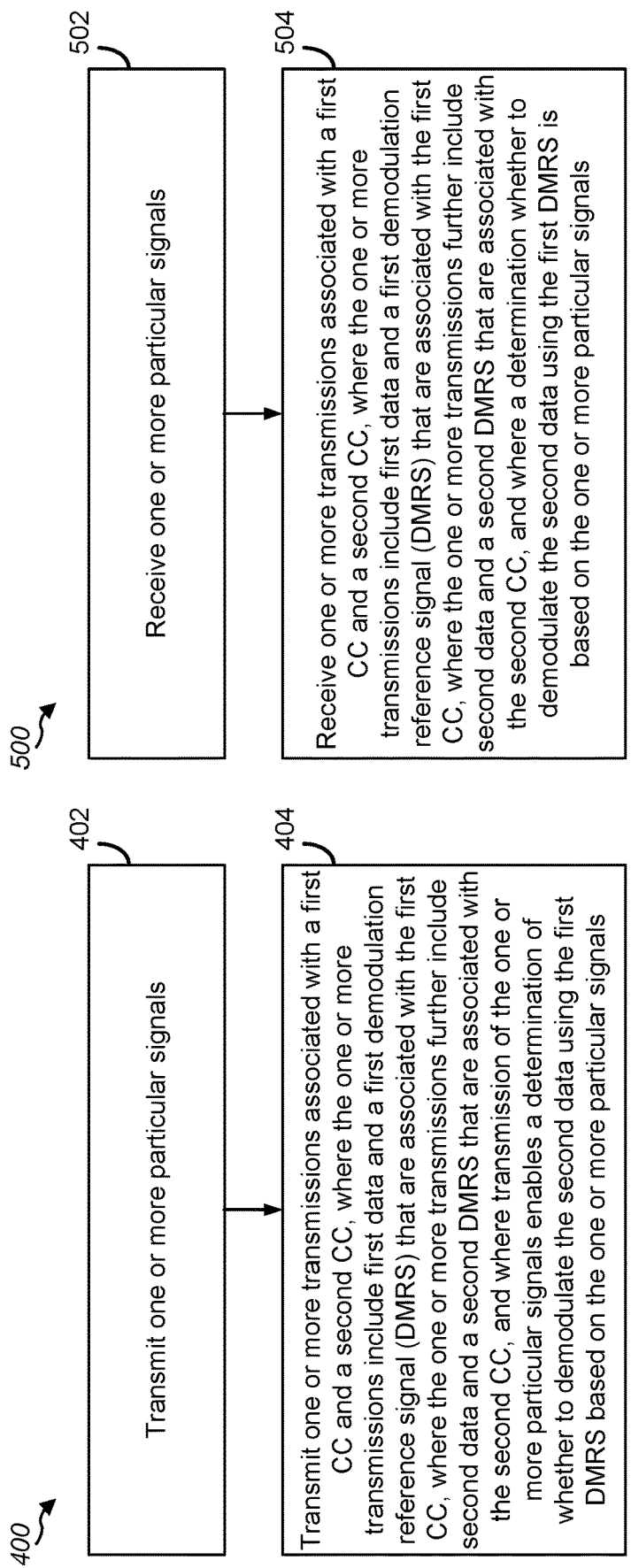
FIG. 4 is a flow diagram illustrating an example of a method of wireless communication performed by a UE according to one or more aspects.
FIG. 5 is a flow diagram illustrating an example of a method of wireless communication performed by a base station according to one or more aspects.

FIG. 4 is a flow chart illustrating an example of a method 400 of wireless communication performed by a UE. In some examples, the method 400 is performed by the UE 115. In some examples, the processor 280 may perform, initiate, or control one or more operations of the method 400.

The method 400 includes transmitting one or more particular signals, at 402. For example, the one or more particular signals may include or correspond to the UE capability message 314. Alternatively or in addition, the one or more particular signals may include or correspond to the PTRS 324. In some examples, the transmitter 356 is configured to transmit the one or more particular signals.

The method 400 further includes transmitting one or more transmissions associated with a first CC and a second CC, at 404. The one or more transmissions include first data and a first DMRS that are associated with the first CC, and the one or more transmissions further include second data and a second DMRS that are associated with the second CC. Transmission of the one or more particular signals enables a determination of whether to demodulate the second data using the first DMRS based on the one or more particular signals. For example, the one or more transmissions may include the first data 326 and the first DMRS 328 transmitted via the first CC 320 and may further include the second data 336 and the second DMRS transmitted via the second CC 330. In some examples, the transmitter 356 is configured to transmit the one or more transmissions.

FIG. 5 is a flow chart illustrating an example of a method 500 of wireless communication performed by a base station. In some examples, the method 500 is performed by the base station 105. In some examples, the processor 240 may perform, initiate, or control one or more operations of the method 400.

The method 500 includes receiving one or more particular signals, at 502. For example, the one or more particular signals may include or correspond to the UE capability message 314. Alternatively or in addition, the one or more particular signals may include or correspond to the PTRS 324. In some examples, the receiver 308 is configured to receive the one or more particular signals.

The method 500 further includes receiving one or more transmissions associated with a first CC and a second CC, at 504. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals. For example, the one or more transmissions may include the first data 326 and the first DMRS 328 transmitted via the first CC 320 and may further include the second data 336 and the second DMRS transmitted via the second CC 330. In some examples, the transmitter the receiver 308 is configured to receive the one or more transmissions. The base station 105 may determine whether to demodulate the second data 336 using the first DMRS 328 (e.g., by performing the joint channel estimation operation 302) based on the one or more particular signals.

Figure 6:
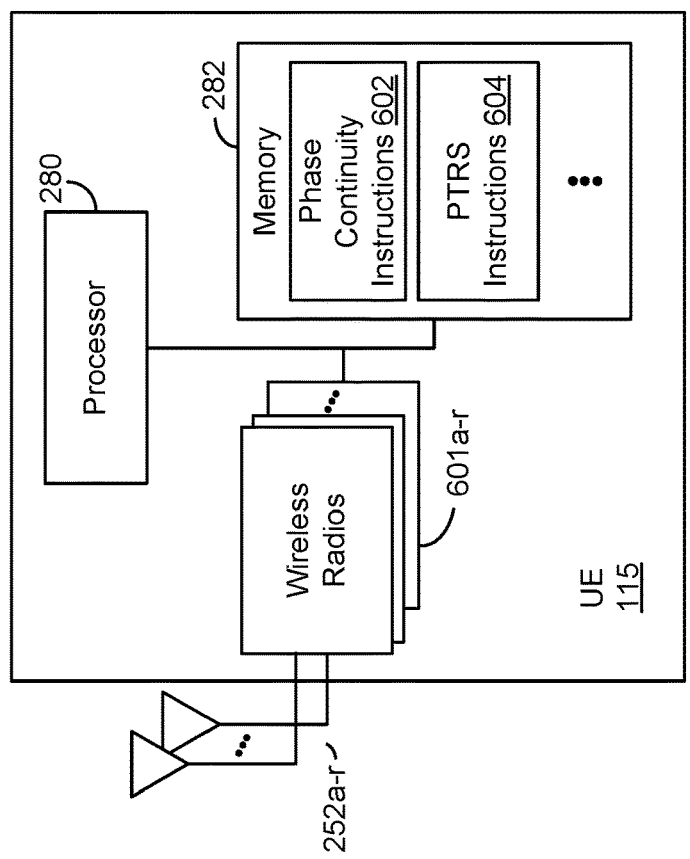
FIG. 6 is a block diagram of an example of a UE according to one or more aspects.

FIG. 6 is a block diagram illustrating an example of a UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 601*a-r* and antennas 252*a-r*. The wireless radios 601*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

The memory 282 may store instructions executable by the processor 280 to initiate, control, or perform one or more operations described herein. For example, the processor 280 may execute phase continuity instructions 602 to determine an amount of phase continuity supported by the UE 115, to initiate transmission of the phase continuity indication 150, or a combination thereof. As another example, the processor 280 may execute PTRS instructions 604 to initiate transmission of the PTRS 324 (e.g., in accordance with the table of PTRS densities 362).

Figure 7:
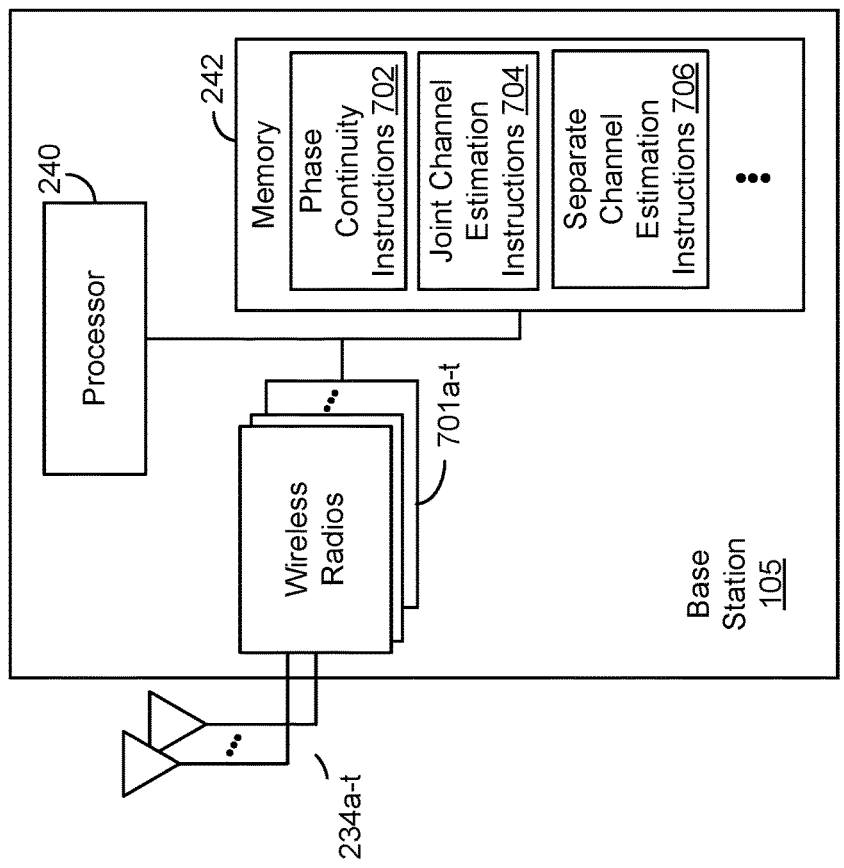
FIG. 7 is a block diagram of an example of a base station according to one or more aspects.

FIG. 7 is a block diagram illustrating an example of a base station 105 according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 701*a-t* and antennas 234*a-t*. The wireless radios 701*a-t* may include one or more components or devices described herein, such as the modulator/demodulators 232*a-t*, the MIMO detector 236, the receive processor 238, the transmit processor 220, the TX MIMO processor 230, the transmitter 306, the receiver 308, one or more other components or devices, or a combination thereof.

The memory 242 may store instructions executable by the processor 240 to initiate, control, or perform one or more operations described herein. For example, the processor 240 may execute phase continuity instructions 702 to determine an amount of phase continuity supported by the UE 115 (e.g., based on one or more of the phase continuity indication 150 or the PTRS 324) and to determine whether the amount of phase continuity satisfies the phase continuity threshold 310. As another example, the processor 240 may execute joint channel estimation instructions 704 to perform the joint channel estimation operation 302 based on determining that the amount of phase continuity fails to exceed the phase continuity threshold 310. As an additional example, the processor 240 may execute separate channel estimation instructions 706 to perform separate channel estimation operations associated with the CCs 320, 330 based on determining that the amount of phase continuity exceeds the phase continuity threshold 310.

According to some further aspects, in a first aspect, a method of wireless communication performed by a base station includes receiving one or more particular signals. The method further includes receiving one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In a second aspect alternatively or in addition to the first aspect, receiving the second data includes: based on determining to demodulate the second data using the first DMRS, performing a joint channel estimation operation using the first DMRS and the second DMRS; and demodulating the second data based on the joint channel estimation operation.

In a third aspect alternatively or in addition to one or more of the first through second aspects, the first data and the second data correspond to repetitions of a physical uplink shared channel (PUSCH) transmission or of a physical uplink control channel (PUCCH) transmission.

In a fourth aspect alternatively or in addition to one or more of the first through third aspects, the one or more particular signals include a user equipment (UE) capability message received from a UE that indicates whether the UE supports maintaining inter-CC phase continuity.

In a fifth aspect alternatively or in addition to one or more of the first through fourth aspects, maintaining the inter-CC phase continuity includes maintaining phase continuity between first resources of the first CC and second resources of the second CC after switching from use of the first resources to use of the second resources.

In a sixth aspect alternatively or in addition to one or more of the first through fifth aspects, the UE transmits the UE capability message based on a determination that a particular time interval to switch from use of first resources of the first CC to second resources of the second CC fails to exceed a threshold time interval.

In a seventh aspect alternatively or in addition to one or more of the first through sixth aspects, the UE transmits the UE capability message based on one or both of the UE or the base station including a common radio frequency (RF) device for the first data and the second data.

In an eighth aspect alternatively or in addition to one or more of the first through seventh aspects, the one or more particular signals include a user equipment (UE) capability message received from a UE that indicates whether the UE supports maintaining multi-CC phase continuity.

In a ninth aspect alternatively or in addition to one or more of the first through eighth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a tenth aspect alternatively or in addition to one or more of the first through ninth aspects, the UE transmits the UE capability message based on one or both of the UE or the base station including a common radio frequency (RF) device for the first data and the second data.

In an eleventh aspect alternatively or in addition to one or more of the first through tenth aspects, the one or more particular signals include a phase tracking reference signal (PTRS) received from a user equipment (UE) and associated with the first CC, and further comprising determining a phase offset estimate associated with the second CC based on the PTRS.

In a twelfth aspect alternatively or in addition to one or more of the first through eleventh aspects, the method includes: determining a capability of the UE to maintain a particular amount of phase continuity associated with the first data and the second data; and determining that the particular amount of phase continuity fails to exceed a phase continuity threshold, where receiving the second data includes performing, based on the phase offset estimate and irrespective of the particular amount of phase continuity failing to exceed the phase continuity threshold, a joint channel estimation operation using the first DMRS and the second DMRS.

In a thirteenth aspect alternatively or in addition to one or more of the first through twelfth aspects, the base station demodulates the second data using the first DMRS based on one or both of the UE or the base station including a common radio frequency (RF) device for the first data and the second data.

In a fourteenth aspect alternatively or in addition to one or more of the first through thirteenth aspects, the method includes configuring the UE with an updated table of PTRS densities associated with the PTRS, and the updated table increases one or both of time density or frequency density of the PTRS to improve accuracy of the phase estimate offset as compared to another table of PTRS densities associated with the PTRS.

In a fifteenth aspect alternatively or in addition to one or more of the first through fourteenth aspects, the one or more signals include an indication of a common radio frequency (RF) device to transmit the first data and the second data.

In a sixteenth aspect alternatively or in addition to one or more of the first through fifteenth aspects, the base station demodulates the second data using the first DMRS based further on the first CC and the second CC being associated with a common subcarrier spacing (SCS) parameter.

In a seventeenth aspect alternatively or in addition to one or more of the first through sixteenth aspects, a base station for wireless communication includes a transmitter, a receiver, at least one processor, and memory. The memory stores instructions executable by the at least one processor to cause the receiver to receive one or more particular signals and one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In an eighteenth aspect alternatively or in addition to one or more of the first through seventeenth aspects, the instructions are further executable by the at least one processor to cause the base station to perform, based on determining to demodulate the second data using the first DMRS, a joint channel estimation operation using the first DMRS and the second DMRS and to demodulate the second data based on the joint channel estimation operation.

In a nineteenth aspect alternatively or in addition to one or more of the first through eighteenth aspects, the first data and the second data correspond to repetitions of a physical uplink shared channel (PUSCH) transmission or of a physical uplink control channel (PUCCH) transmission.

In a twentieth aspect alternatively or in addition to one or more of the first through nineteenth aspects, the one or more particular signals include a user equipment (UE) capability message received from a UE that indicates whether the UE supports maintaining inter-CC phase continuity.

In a twenty-first aspect alternatively or in addition to one or more of the first through twentieth aspects, maintaining the inter-CC phase continuity includes maintaining phase continuity between first resources of the first CC and second resources of the second CC after switching from use of the first resources to use of the second resources.

In a twenty-second aspect alternatively or in addition to one or more of the first through twenty-first aspects, the instructions are further executable by the at least one processor to cause the receiver to receive the UE capability message based on a determination that a particular time interval to switch from use of first resources of the first CC to second resources of the second CC fails to exceed a threshold time interval.

In a twenty-third aspect alternatively or in addition to one or more of the first through twenty-second aspects, the instructions are further executable by the at least one processor to cause the receiver to receive the UE capability message based on one or both of the UE or the base station including a common radio frequency (RF) device for the first data and the second data.

In a twenty-fourth aspect alternatively or in addition to one or more of the first through twenty-third aspects, the one or more particular signals include a UE capability message that indicates whether the UE supports maintaining multi-CC phase continuity.

In a twenty-fifth aspect alternatively or in addition to one or more of the first through twenty-fourth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a twenty-sixth aspect alternatively or in addition to one or more of the first through twenty-fifth aspects, the instructions are further executable by the at least one processor to cause the receiver to receive the UE capability message based on one or both of the UE or the base station including a common radio frequency (RF) device for the first data and the second data.

In a twenty-seventh aspect alternatively or in addition to one or more of the first through twenty-sixth aspects, the one or more particular signals include a phase tracking reference signal (PTRS) received from a UE and associated with the first CC, and a phase offset estimate associated with the second CC is based on the PTRS.

In a twenty-eighth aspect alternatively or in addition to one or more of the first through twenty-seventh aspects, the instructions are further executable by the at least one processor to cause the base station to: determine a capability of the UE to maintain a particular amount of phase continuity associated with the first data and the second data; determine that the particular amount of phase continuity fails to exceed a phase continuity threshold; and perform, based on the phase offset estimate and irrespective of the particular amount of phase continuity failing to exceed the phase continuity threshold, a joint channel estimation operation using the first DMRS and the second DMRS.

In a twenty-ninth aspect alternatively or in addition to one or more of the first through twenty-eighth aspects, the instructions are further executable by the at least one processor to cause the receiver to demodulate the second data using the first DMRS based on one or both of the UE or the base station including a common radio frequency (RF) device for the first data and the second data.

In a thirtieth aspect alternatively or in addition to one or more of the first through twenty-ninth aspects, the instructions are further executable by the at least one processor to cause the transmitter to configure the UE with an updated table of PTRS densities associated with the PTRS, and the updated table increases one or both of time density or frequency density of the PTRS to improve accuracy of the phase estimate offset as compared to another table of PTRS densities associated with the PTRS.

In a thirty-first aspect alternatively or in addition to one or more of the first through thirtieth aspects, the one or more signals include an indication of a common radio frequency (RF) device to transmit the first data and the second data.

In a thirty-second aspect alternatively or in addition to one or more of the first through thirty-first aspects, the instructions are further executable by the at least one processor to cause the receiver to demodulate the second data using the first DMRS based further on the first CC and the second CC being associated with a common subcarrier spacing (SCS) parameter.

In a thirty-third aspect alternatively or in addition to one or more of the first through thirty-second aspects, a non-transitory computer-readable medium stores instructions executable by a base station to initiate, perform, or control operations. The operations include receiving one or more particular signals and receiving one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In a thirty-fourth aspect alternatively or in addition to one or more of the first through thirty-third aspects, receiving the second data includes: based on determining to demodulate the second data using the first DMRS, performing a joint channel estimation operation using the first DMRS and the second DMRS; and demodulating the second data based on the joint channel estimation operation.

In a thirty-fifth aspect alternatively or in addition to one or more of the first through thirty-fourth aspects, the first data and the second data correspond to repetitions of a physical uplink shared channel (PUSCH) transmission or of a physical uplink control channel (PUCCH) transmission.

In a thirty-sixth aspect alternatively or in addition to one or more of the first through thirty-fifth aspects, the one or more particular signals include a user equipment (UE) capability message received from a UE that indicates whether the UE supports maintaining inter-CC phase continuity.

In a thirty-seventh aspect alternatively or in addition to one or more of the first through thirty-sixth aspects, maintaining the inter-CC phase continuity includes maintaining phase continuity between first resources of the first CC and second resources of the second CC after switching from use of the first resources to use of the second resources.

In a thirty-eighth aspect alternatively or in addition to one or more of the first through thirty-seventh aspects, the UE transmits the UE capability message based on a determination that a particular time interval to switch from use of first resources of the first CC to second resources of the second CC fails to exceed a threshold time interval.

In a thirty-ninth aspect alternatively or in addition to one or more of the first through thirty-eighth aspects, the UE transmits the UE capability message based on one or both of the UE or the base station including a common radio frequency (RF) device for the first data and the second data.

In a fortieth aspect alternatively or in addition to one or more of the first through thirty-ninth aspects, the one or more particular signals include a user equipment (UE)

capability message received from a UE that indicates whether the UE supports maintaining multi-CC phase continuity.

In a forty-first aspect alternatively or in addition to one or more of the first through fortieth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a forty-second aspect alternatively or in addition to one or more of the first through forty-first aspects, the UE transmits the UE capability message based on one or both of the UE or the base station including a common radio frequency (RF) device for the first data and the second data.

In a forty-third aspect alternatively or in addition to one or more of the first through forty-second aspects, the one or more particular signals include a phase tracking reference signal (PTRS) received from a user equipment (UE) and associated with the first CC, and the operations further include determining a phase offset estimate associated with the second CC based on the PTRS.

In a forty-fourth aspect alternatively or in addition to one or more of the first through forty-third aspects, the operations further include: determining a capability of the UE to maintain a particular amount of phase continuity associated with the first data and the second data; and determining that the particular amount of phase continuity fails to exceed a phase continuity threshold, where receiving the second data includes performing, based on the phase offset estimate and irrespective of the particular amount of phase continuity failing to exceed the phase continuity threshold, a joint channel estimation operation using the first DMRS and the second DMRS.

In a forty-fifth aspect alternatively or in addition to one or more of the first through forty-fifth aspects, the base station demodulates the second data using the first DMRS based on one or both of the UE or the base station including a common radio frequency (RF) device for the first data and the second data.

In a forty-sixth aspect alternatively or in addition to one or more of the first through forty-fifth aspects, the operations further include configuring the UE with an updated table of PTRS densities associated with the PTRS, where the updated table increases one or both of time density or frequency density of the PTRS to improve accuracy of the phase estimate offset as compared to another table of PTRS densities associated with the PTRS.

In a forty-seventh aspect alternatively or in addition to one or more of the first through forty-sixth aspects, the one or more signals include an indication of a common radio frequency (RF) device to transmit the first data and the second data.

In a forty-eighth aspect alternatively or in addition to one or more of the first through forty-seventh aspects, the base station demodulates the second data using the first DMRS based further on the first CC and the second CC being associated with a common subcarrier spacing (SCS) parameter.

In a forty-ninth aspect alternatively or in addition to one or more of the first through forty-eighth aspects, a base station for wireless communication includes means for transmitting. The base station further includes means for receiving one or more particular signals and for receiving one or more transmissions associated with a first CC and a second CC. The one or more transmissions include first data and a first DMRS that are associated with the first CC, and the one or more transmissions further include second data and a second DMRS that are associated with the second CC. A determination whether to demodulate the second data using the first DMRS is based on the one or more particular signals.

In a fiftieth aspect alternatively or in addition to one or more of the first through forty-ninth aspects, the means for receiving is configured to perform, based on determining to demodulate the second data using the first DMRS, a joint channel estimation operation using the first DMRS and the second DMRS and to demodulate the second data based on the joint channel estimation operation.

In a fifty-first aspect alternatively or in addition to one or more of the first through fiftieth aspects, the first data and the second data correspond to repetitions of a physical uplink shared channel (PUSCH) transmission or of a physical uplink control channel (PUCCH) transmission.

In a fifty-second aspect alternatively or in addition to one or more of the first through fifty-first aspects, the one or more particular signals include a user equipment (UE) capability message received from a UE that indicates whether the UE supports maintaining inter-CC phase continuity.

In a fifty-third aspect alternatively or in addition to one or more of the first through fifty-second aspects, maintaining the inter-CC phase continuity includes maintaining phase continuity between first resources of the first CC and second resources of the second CC after switching from use of the first resources to use of the second resources.

In a fifty-fourth aspect alternatively or in addition to one or more of the first through fifty-third aspects, the UE transmits the UE capability message based on a determination that a particular time interval to switch from use of first resources of the first CC to second resources of the second CC fails to exceed a threshold time interval.

In a fifty-fifth aspect alternatively or in addition to one or more of the first through fifty-fourth aspects, the UE transmits the UE capability message based on one or both of the UE or the base station including a common radio frequency (RF) device for the first data and the second data.

In a fifty-sixth aspect alternatively or in addition to one or more of the first through fifty-fifth aspects, the one or more particular signals include a UE capability message that indicates whether the UE supports maintaining multi-CC phase continuity.

In a fifty-seventh aspect alternatively or in addition to one or more of the first through fifty-sixth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a fifty-eighth aspect alternatively or in addition to one or more of the first through fifty-seventh aspects, the UE transmits the UE capability message based on one or both of the UE or the base station including a common radio frequency (RF) device for the first data and the second data.

In a fifty-ninth aspect alternatively or in addition to one or more of the first through fifty-eighth aspects, the one or more particular signals include a phase tracking reference signal (PTRS) received from a UE and associated with the first CC, and a phase offset estimate associated with the second CC is based on the PTRS.

In a sixtieth aspect alternatively or in addition to one or more of the first through fifty-ninth aspects, the base station includes means for determining a capability of the UE to maintain a particular amount of phase continuity associated with the first data and the second data, for determining that the particular amount of phase continuity fails to exceed a phase continuity threshold, and for performing, based on the phase offset estimate and irrespective of the particular amount of phase continuity failing to exceed the phase continuity threshold, a joint channel estimation operation using the first DMRS and the second DMRS.

In a sixty-first aspect alternatively or in addition to one or more of the first through sixtieth aspects, the means for receiving is configured to demodulate the second data using the first DMRS based on one or both of the UE or the base station including a common radio frequency (RF) device for the first data and the second data.

In a sixty-second aspect alternatively or in addition to one or more of the first through sixty-first aspects, the means for transmitting is configured to configure the UE with an updated table of PTRS densities associated with the PTRS, and the updated table increases one or both of time density or frequency density of the PTRS to improve accuracy of the phase estimate offset as compared to another table of PTRS densities associated with the PTRS.

In a sixty-third aspect alternatively or in addition to one or more of the first through sixty-second aspects, the one or more signals include an indication of a common radio frequency (RF) device to transmit the first data and the second data.

In a sixty-fourth aspect alternatively or in addition to one or more of the first through sixty-third aspects, the means for receiving is configured to demodulate the second data using the first DMRS based further on the first CC and the second CC being associated with a common subcarrier spacing (SCS) parameter.

In a sixty-fifth aspect alternatively or in addition to one or more of the first through sixty-fourth aspects, a method of wireless communication performed by a user equipment (UE) includes transmitting one or more particular signals. The method further includes transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether to demodulate the second data using the first DMRS based on the one or more particular signals.

In a sixty-sixth aspect alternatively or in addition to one or more of the first through sixty-fifth aspects, the first data and the second data correspond to repetitions of a physical uplink shared channel (PUSCH) transmission or of a physical uplink control channel (PUCCH) transmission.

In a sixty-seventh aspect alternatively or in addition to one or more of the first through sixty-sixth aspects, the one or more particular signals include a UE capability message that indicates whether the UE supports maintaining inter-CC phase continuity.

In a sixty-eighth aspect alternatively or in addition to one or more of the first through sixty-seventh aspects, maintaining the inter-CC phase continuity includes maintaining phase continuity between first resources of the first CC and second resources of the second CC after switching from use of the first resources to use of the second resources.

In a sixty-ninth aspect alternatively or in addition to one or more of the first through sixty-eighth aspects, the UE transmits the UE capability message based on a determination that a particular time interval to switch from use of first resources of the first CC to second resources of the second CC fails to exceed a threshold time interval.

In a seventieth aspect alternatively or in addition to one or more of the first through sixty-ninth aspects, the UE transmits the UE capability message based on one or both of the UE or a base station including a common radio frequency (RF) device for the first data and the second data.

In a seventy-first aspect alternatively or in addition to one or more of the first through seventieth aspects, the one or more particular signals include a UE capability message that indicates whether the UE supports maintaining multi-CC phase continuity.

In a seventy-second aspect alternatively or in addition to one or more of the first through seventy-first aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a seventy-third aspect alternatively or in addition to one or more of the first through seventy-second aspects, the UE transmits the UE capability message based on one or both of the UE or a base station including a common radio frequency (RF) device for the first data and the second data.

In a seventy-fourth aspect alternatively or in addition to one or more of the first through seventy-third aspects, the one or more particular signals include a phase tracking reference signal (PTRS) associated with the first CC.

In a seventy-fifth aspect alternatively or in addition to one or more of the first through seventy-fourth aspects, the method includes receiving an updated table of PTRS densities associated with the PTRS, and the updated table increases one or both of time density or frequency density of the PTRS to improve accuracy of the phase estimate offset as compared to another table of PTRS densities associated with the PTRS.

In a seventy-sixth aspect alternatively or in addition to one or more of the first through seventy-fifth aspects, the one or more signals include an indication of a common radio frequency (RF) device to transmit the first data and the second data.

In a seventy-seventh aspect alternatively or in addition to one or more of the first through seventy-sixth aspects, the UE transmits the one or more signals based further on the first CC and the second CC being associated with a common subcarrier spacing (SCS) parameter.

In a seventy-eighth aspect alternatively or in addition to one or more of the first through seventy-seventh aspects, a UE for wireless communication includes a receiver, a transmitter, at least one processor, and memory. The memory stores instructions executable by the at least one processor to cause the transmitter to transmit one or more particular signals. The memory stores instructions executable by the at least one processor to cause the transmitter to transmit one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether to demodulate the second data using the first DMRS based on the one or more particular signals.

In a seventy-ninth aspect alternatively or in addition to one or more of the first through seventy-eighth aspects, the first data and the second data correspond to repetitions of a physical uplink shared channel (PUSCH) transmission or of a physical uplink control channel (PUCCH) transmission.

In an eightieth aspect alternatively or in addition to one or more of the first through seventy-ninth aspects, the one or more particular signals include a UE capability message that indicates whether the UE supports maintaining inter-CC phase continuity.

In an eighty-first aspect alternatively or in addition to one or more of the first through eightieth aspects, maintaining the inter-CC phase continuity includes maintaining phase continuity between first resources of the first CC and second resources of the second CC after switching from use of the first resources to use of the second resources.

In an eighty-second aspect alternatively or in addition to one or more of the first through eighty-first aspects, the instructions are further executable by the at least one processor to cause the transmitter to transmit the UE capability message based on a determination that a particular time interval to switch from use of first resources of the first CC to second resources of the second CC fails to exceed a threshold time interval.

In an eighty-third aspect alternatively or in addition to one or more of the first through eighty-second aspects, the instructions are further executable by the at least one processor to cause the transmitter to transmit the UE capability message based on one or both of the UE or a base station including a common radio frequency (RF) device for the first data and the second data.

In an eighty-fourth aspect alternatively or in addition to one or more of the first through eighty-third aspects, the one or more particular signals include a UE capability message that indicates whether the UE supports maintaining multi-CC phase continuity.

In an eighty-fifth aspect alternatively or in addition to one or more of the first through eighty-fourth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In an eighty-sixth aspect alternatively or in addition to one or more of the first through eighty-fifth aspects, the instructions are further executable by the at least one processor to cause the transmitter to transmit the UE capability message based on one or both of the UE or a base station including a common radio frequency (RF) device for the first data and the second data.

In an eighty-seventh aspect alternatively or in addition to one or more of the first through eighty-sixth aspects, the one or more particular signals include a phase tracking reference signal (PTRS) associated with the first CC.

In an eighty-eighth aspect alternatively or in addition to one or more of the first through eighty-seventh aspects, the instructions are further executable by the at least one processor to cause the receiver to receive an updated table of PTRS densities associated with the PTRS, and the updated table increases one or both of time density or frequency density of the PTRS to improve accuracy of the phase estimate offset as compared to another table of PTRS densities associated with the PTRS.

In an eighty-ninth aspect alternatively or in addition to one or more of the first through eighty-eighth aspects, the one or more signals include an indication of a common radio frequency (RF) device to transmit the first data and the second data.

In a ninetieth aspect alternatively or in addition to one or more of the first through eighty-ninth aspects, the instructions are further executable by the at least one processor to cause the transmitter to transmit the one or more signals based further on the first CC and the second CC being associated with a common subcarrier spacing (SCS) parameter.

In a ninety-first aspect alternatively or in addition to one or more of the first through ninetieth aspects, a non-transitory computer-readable medium stores instructions executable by a UE to initiate, perform, or control operations. The operations include transmitting one or more particular signals and further include transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether to demodulate the second data using the first DMRS based on the one or more particular signals.

In a ninety-second aspect alternatively or in addition to one or more of the first through ninety-first aspects, the first data and the second data correspond to repetitions of a physical uplink shared channel (PUSCH) transmission or of a physical uplink control channel (PUCCH) transmission.

In a ninety-third aspect alternatively or in addition to one or more of the first through ninety-second aspects, the one or more particular signals include a UE capability message that indicates whether the UE supports maintaining inter-CC phase continuity.

In a ninety-fourth aspect alternatively or in addition to one or more of the first through ninety-third aspects, maintaining the inter-CC phase continuity includes maintaining phase continuity between first resources of the first CC and second resources of the second CC after switching from use of the first resources to use of the second resources.

In a ninety-fifth aspect alternatively or in addition to one or more of the first through ninety-fifth aspects, the UE transmits the UE capability message based on a determination that a particular time interval to switch from use of first resources of the first CC to second resources of the second CC fails to exceed a threshold time interval.

In a ninety-sixth aspect alternatively or in addition to one or more of the first through ninety-fifth aspects, the UE transmits the UE capability message based on one or both of the UE or a base station including a common radio frequency (RF) device for the first data and the second data.

In a ninety-seventh aspect alternatively or in addition to one or more of the first through ninety-sixth aspects, the one or more particular signals include a UE capability message that indicates whether the UE supports maintaining multi-CC phase continuity.

In a ninety-eighth aspect alternatively or in addition to one or more of the first through ninety-seventh aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a ninety-ninth aspect alternatively or in addition to one or more of the first through ninety-eighth aspects, the UE transmits the UE capability message based on one or both of the UE or a base station including a common radio frequency (RF) device for the first data and the second data.

In a one-hundredth aspect alternatively or in addition to one or more of the first through ninety-ninth aspects, the one or more particular signals include a phase tracking reference signal (PTRS) associated with the first CC.

In a one-hundred-and-first aspect alternatively or in addition to one or more of the first through one-hundredth aspects, the operations include receiving an updated table of PTRS densities associated with the PTRS, and the updated table increases one or both of time density or frequency density of the PTRS to improve accuracy of the phase estimate offset as compared to another table of PTRS densities associated with the PTRS.

In a one-hundred-and-second aspect alternatively or in addition to one or more of the first through one-hundred-and-first aspects, the one or more signals include an indication of a common radio frequency (RF) device to transmit the first data and the second data.

In a one-hundred-and-third aspect alternatively or in addition to one or more of the first through one-hundred-and-second aspects, the UE transmits the one or more signals based further on the first CC and the second CC being associated with a common subcarrier spacing (SCS) parameter.

In a one-hundred-and-fourth aspect alternatively or in addition to one or more of the first through one-hundred-and-third aspects, a UE for wireless communication includes means for receiving and means for transmitting one or more particular signals and for transmitting one or more transmissions associated with a first CC and a second CC. The one or more transmissions include first data and a first DMRS that are associated with the first CC, and the one or more transmissions further include second data and a second DMRS that are associated with the second CC. Transmission of the one or more particular signals enables a determination of whether to demodulate the second data using the first DMRS based on the one or more particular signals.

In a one-hundred-and-fifth aspect alternatively or in addition to one or more of the first through one-hundred-and-fourth aspects, the first data and the second data correspond to repetitions of a physical uplink shared channel (PUSCH) transmission or of a physical uplink control channel (PUCCH) transmission.

In a one-hundred-and-sixth aspect alternatively or in addition to one or more of the first through one-hundred-and-fifth aspects, the one or more particular signals include a UE capability message that indicates whether the UE supports maintaining inter-CC phase continuity.

In a one-hundred-and-seventh aspect alternatively or in addition to one or more of the first through one-hundred-and-sixth aspects, maintaining the inter-CC phase continuity includes maintaining phase continuity between first resources of the first CC and second resources of the second CC after switching from use of the first resources to use of the second resources.

In a one-hundred-and-eighth aspect alternatively or in addition to one or more of the first through one-hundred-and-seventh aspects, the UE transmits the UE capability message based on a determination that a particular time interval to switch from use of first resources of the first CC to second resources of the second CC fails to exceed a threshold time interval.

In a one-hundred-and-ninth aspect alternatively or in addition to one or more of the first through one-hundred-and-eighth aspects, the UE transmits the UE capability message based on one or both of the UE or a base station including a common radio frequency (RF) device for the first data and the second data.

In a one-hundred-and-tenth aspect alternatively or in addition to one or more of the first through one-hundred-and-ninth aspects, the one or more particular signals include a UE capability message that indicates whether the UE supports maintaining multi-CC phase continuity.

In a one-hundred-and-eleventh aspect alternatively or in addition to one or more of the first through one-hundred-and-tenth aspects, maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

In a one-hundred-and-twelfth aspect alternatively or in addition to one or more of the first through one-hundred-and-eleventh aspects, the UE transmits the UE capability message based on one or both of the UE or a base station including a common radio frequency (RF) device for the first data and the second data.

In a one-hundred-and-thirteenth aspect alternatively or in addition to one or more of the first through one-hundred-and-twelfth aspects, the one or more particular signals include a phase tracking reference signal (PTRS) associated with the first CC.

In a one-hundred-and-fourteenth aspect alternatively or in addition to one or more of the first through one-hundred-and-thirteenth aspects, the means for receiving is configured to receive an updated table of PTRS densities associated with the PTRS, and the updated table increases one or both of time density or frequency density of the PTRS to improve accuracy of the phase estimate offset as compared to another table of PTRS densities associated with the PTRS.

In a one-hundred-and-fifteenth aspect alternatively or in addition to one or more of the first through one-hundred-and-fourteenth aspects, the one or more signals include an indication of a common radio frequency (RF) device to transmit the first data and the second data.

In a one-hundred-and-sixteenth aspect alternatively or in addition to one or more of the first through one-hundred-and-fifteenth aspects, the UE transmits the one or more signals based further on the first CC and the second CC being associated with a common subcarrier spacing (SCS) parameter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and operations described herein may be implemented as electronic hardware, computer software, or combinations of both. To illustrate t, various illustrative components, blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the disclosure.

A hardware and data processing apparatus used to implement the various illustrative logics, logical blocks, modules, and circuits described herein may be implemented or performed with a general purpose single- or multi-chip processor, a digital signal processor (DSP), a central processing unit (CPU), a graphics processing unit (GPU), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, one or more functions described herein may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The operations of a method or process described herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), phase change memory, flash memory, electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a base station, the apparatus comprising:
    a processing system including one or more processors and one or more memories, the processing system configured to cause a receiver to receive one or more particular signals and to further receive one or more transmissions associated with a first CC and a second CC, wherein the one or more transmissions include first data and a first demodulation reference signal (DMRS) that are associated with the first CC, wherein the one or more transmissions further include second data and a second DMRS that are associated with the second CC, and wherein a determination whether to demodulate the second data using the first DMRS is based on the one or more particular signals.

2. The apparatus of claim 1, wherein the processing system is further configured to cause the receiver to perform a joint channel estimation operation using the first DMRS and the second DMRS and to demodulate the second data based on the joint channel estimation operation.

3. The apparatus of claim 1, wherein the first data and the second data correspond to repetitions of a physical uplink shared channel (PUSCH) transmission or of a physical uplink control channel (PUCCH) transmission.

4. The apparatus of claim 1, wherein the one or more particular signals include a user equipment (UE) capability message received from a UE that indicates whether the UE supports maintaining inter-CC phase continuity.

5. The apparatus of claim 4, wherein maintaining the inter-CC phase continuity includes maintaining phase continuity between first resources of the first CC and second resources of the second CC after switching from use of the first resources to use of the second resources.

6. The apparatus of claim 4, wherein the processing system is further configured to cause the receiver to receive the UE capability message based on a particular time interval to switch from use of first resources of the first CC to second resources of the second CC failing to exceed a threshold time interval.

7. The apparatus of claim 4, wherein the processing system is further configured to cause the receiver to receive the UE capability message based on one or both of the UE or the base station including a common radio frequency (RF) device for the first data and the second data.

8. The apparatus of claim 1, wherein the one or more particular signals include a user equipment (UE) capability message received from a UE that indicates whether the UE supports maintaining multi-CC phase continuity.

9. The apparatus of claim 8, wherein maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

10. The apparatus of claim 8, wherein the processing system is further configured to cause the receiver to receive the UE capability message based on one or both of the UE or the base station including a common radio frequency (RF) device for the first data and the second data.

11. The apparatus of claim 1, wherein the one or more particular signals include a phase tracking reference signal (PTRS) received from a user equipment (UE) and associated with the first CC, and wherein a phase offset estimate associated with the second CC is based on the PTRS.

12. The apparatus of claim 11, wherein the processing system is further configured to:
    determine a capability of the UE to maintain a particular amount of phase continuity associated with the first data and the second data;
    determine that the particular amount of phase continuity fails to exceed a phase continuity threshold; and
    perform, based on the phase offset estimate and irrespective of the particular amount of phase continuity failing to exceed the phase continuity threshold, a joint channel estimation operation using the first DMRS and the second DMRS.

13. The apparatus of claim 11, wherein the processing system is further configured to cause the receiver to demodulate the second data using the first DMRS based on one or both of the UE or the base station including a common radio frequency (RF) device for the first data and the second data.

14. The apparatus of claim 11, wherein the processing system is further configured to cause a transmitter to configure the UE with an updated table of PTRS densities associated with the PTRS, and wherein the updated table increases one or both of time density or frequency density of the PTRS to improve accuracy of the phase offset estimate as compared to another table of PTRS densities associated with the PTRS.

15. The apparatus of claim 1, wherein the processing system is further configured to cause the receiver to demodulate the second data using the first DMRS based further on the first CC and the second CC being associated with a common subcarrier spacing (SCS) parameter.

16. A method of wireless communication performed by a base station, the method comprising:
    receiving one or more particular signals; and
    receiving one or more transmissions associated with a first CC and a second CC, wherein the one or more transmissions include first data and a first demodulation reference signal (DMRS) that are associated with the first CC, wherein the one or more transmissions further include second data and a second DMRS that are associated with the second CC, and wherein a determination of whether to demodulate the second data using the first DMRS is based on the one or more particular signals.

17. An apparatus for wireless communication by a user equipment (UE), the apparatus comprising:
a processing system including one or more processors and one or more memories, the processing system configured to cause a transmitter to transmit one or more particular signals and to further transmit one or more transmissions associated with a first CC and a second CC, wherein the one or more transmissions include first data and a first demodulation reference signal (DMRS) that are associated with the first CC, wherein the one or more transmissions further include second data and a second DMRS that are associated with the second CC, and wherein the transmission of the one or more particular signals enables a determination of whether to demodulate the second data using the first DMRS based on the one or more particular signals.

18. The apparatus of claim 17, wherein the first data and the second data correspond to repetitions of a physical uplink shared channel (PUSCH) transmission or of a physical uplink control channel (PUCCH) transmission.

19. The apparatus of claim 17, wherein the one or more particular signals include a user equipment (UE) capability message received from a UE that indicates whether the UE supports maintaining inter-CC phase continuity.

20. The apparatus of claim 19, wherein maintaining the inter-CC phase continuity includes maintaining phase continuity between first resources of the first CC and second resources of the second CC after switching from use of the first resources to use of the second resources.

21. The apparatus of claim 19, wherein the wherein the processing system is further configured to cause the transmitter to transmit the UE capability message based on a particular time interval to switch from use of first resources of the first CC to second resources of the second CC failing to exceed a threshold time interval.

22. The apparatus of claim 17, wherein the one or more particular signals include a UE capability message that indicates whether the UE supports maintaining multi-CC phase continuity.

23. The apparatus of claim 22, wherein maintaining the multi-CC phase continuity includes maintaining phase continuity between first resources of the first CC and second resources of the first CC after switching from use of the first resources to use of the second resources and further includes maintaining phase continuity between third resources of the second CC and fourth resources of the second CC after switching from use of the first resources to use of the second resources.

24. The apparatus of claim 22, wherein the processing system is further configured to cause the transmitter to transmit the UE capability message based on one or both of the UE or a base station including a common radio frequency (RF) device for the first data and the second data.

25. The apparatus of claim 17, wherein the one or more particular signals include a phase tracking reference signal (PTRS) associated with the first CC, wherein the processing system is further configured to cause a receiver to receive an updated table of PTRS densities associated with the PTRS, and wherein the updated table increases one or both of time density or frequency density of the PTRS to improve accuracy of a phase offset estimate as compared to another table of PTRS densities associated with the PTRS.

26. The apparatus of claim 17, wherein the processing system is further configured to cause the transmitter to transmit the one or more particular signals based further on the first CC and the second CC being associated with a common subcarrier spacing (SCS) parameter.

27. A method of wireless communication performed by a user equipment (UE), the method comprising:
transmitting one or more particular signals; and
transmitting one or more transmissions associated with a first CC and a second CC, wherein the one or more transmissions include first data and a first demodulation reference signal (DMRS) that are associated with the first CC, wherein the one or more transmissions further include second data and a second DMRS that are associated with the second CC, and wherein the transmitting the one or more particular signals enables a determination of whether to demodulate the second data using the first DMRS based on the one or more particular signals.

28. The method of claim 27, wherein the one or more particular signals are associated with an amount of phase continuity supported by the UE, and wherein the determination of whether to demodulate the second data using the first DMRS is based further on whether the amount of phase continuity exceeds a threshold.

29. The method of claim 28, wherein the one or more particular signals directly or indirectly indicate the amount of phase continuity supported by the UE.

30. The method of claim 16, wherein the one or more particular signals are associated with an amount of phase continuity supported by a user equipment (UE), and wherein the determination of whether to demodulate the second data using the first DMRS is based further on whether the amount of phase continuity exceeds a threshold.

* * * * *